(12) United States Patent
Böttcher

(10) Patent No.: US 8,029,673 B2
(45) Date of Patent: Oct. 4, 2011

(54) VERTICAL-HORIZONTAL FILTER UNIT FOR THE BIOLOGICAL PURIFICATION OF POLLUTED WATER

(76) Inventor: Joachim Böttcher, Hengstbacherhof (DE)

(*) Notice: Subject to any disclaimer, the term of this patent is extended or adjusted under 35 U.S.C. 154(b) by 133 days.

(21) Appl. No.: 12/516,154

(22) PCT Filed: Nov. 23, 2007

(86) PCT No.: PCT/EP2007/010202
§ 371 (c)(1),
(2), (4) Date: Jun. 24, 2009

(87) PCT Pub. No.: WO2008/061785
PCT Pub. Date: May 29, 2008

(65) Prior Publication Data
US 2010/0059438 A1 Mar. 11, 2010

(30) Foreign Application Priority Data
Nov. 25, 2006 (EP) .................................. 06024475

(51) Int. Cl.
*C02F 3/06* (2006.01)
*C02F 3/30* (2006.01)
(52) U.S. Cl. ........ 210/605; 210/617; 210/630; 210/150; 210/170.08; 210/903
(58) Field of Classification Search .................. 210/605, 210/617, 630, 150, 151, 170.08, 903
See application file for complete search history.

(56) References Cited

U.S. PATENT DOCUMENTS

| | | | | |
|---|---|---|---|---|
| 5,733,453 A * | 3/1998 | DeBusk | ......................... | 210/150 |
| 5,951,866 A * | 9/1999 | Grove et al. | ............. | 210/170.08 |
| 6,406,627 B1 * | 6/2002 | Wallace | ......................... | 210/617 |
| 6,858,142 B2 * | 2/2005 | Towndrow | ..................... | 210/150 |
| 6,890,439 B2 * | 5/2005 | Cameron | ...................... | 210/617 |
| 7,510,649 B1 * | 3/2009 | Lavigne | ........................ | 210/151 |
| 2005/0284811 A1 * | 12/2005 | Potts | ............................. | 210/617 |

(Continued)

FOREIGN PATENT DOCUMENTS
CH          671571        *   9/1989
(Continued)

OTHER PUBLICATIONS

International Search Report for International Application No. PCT/EP2007/010202, mailed Mar. 27, 2008.

(Continued)

*Primary Examiner* — Christopher Upton
(74) *Attorney, Agent, or Firm* — Clark & Elbing LLP

(57) ABSTRACT

The present invention relates to a vertical-horizontal filter unit for the biological purification of polluted water, comprising an upper zone of a soil patch planted with plants, having inlets for the polluted water, and arranged underneath a sand layer with a lower filter zone made of gravel and at least one removal point for the purified water, wherein between the upper and lower filter zones a barrier layer with openings is arranged and the filter unit is sealed against the soil on the sides and at the bottom. The openings in the barrier layer are arranged along the edge and/or the barrier layer does not reach the edge of the patch completely. The invention is characterized in that the upper zone acts as an aerobically cleaning zone and the lower zone as an anaerobically cleaning zone.

16 Claims, 2 Drawing Sheets

U.S. PATENT DOCUMENTS

2006/0151387 A1* 7/2006 Yost et al. .................. 210/605
2008/0197073 A1* 8/2008 Jacquet .................... 210/602

FOREIGN PATENT DOCUMENTS

| DE | 42 25 699 C1 | | 1/1994 |
|----|----|----|----|
| DE | 43 23 610 C1 | | 2/1995 |
| DE | 4422017 | * | 5/1995 |
| DE | 197 37 690 A1 | | 1/1998 |

OTHER PUBLICATIONS

Written Opinion for International Application No. PCT/EP2007/010202, mailed Mar. 27, 2008.

English Language International Preliminary Report on Patentability for International Application No. PCT/EP2007/010202, dated Jun. 10, 2009.

* cited by examiner

VERTICAL-HORIZONTAL FILTER UNIT FOR THE BIOLOGICAL PURIFICATION OF POLLUTED WATER

CROSS-REFERENCE TO RELATED APPLICATIONS

The present application is the U.S. National Stage of International Application No. PCT/EP2007/010202, filed Nov. 23, 2007, which claims the benefit of European Application Serial No. EP 06024475.3, filed Nov. 25, 2006.

BACKGROUND OF THE INVENTION

Technically complex sewage plants are used in urban conurbations for the purification of household and industrial wastewater. In contrast, in rural areas, there is a need for cost-effective and ecologically compatible wastewater purification units, e.g., constructed wetlands, which may be incorporated into the landscape picture and operated in an environmentally compatible way.

Such constructed wetlands include, for example, the constructed wetland described in DE 42 25 699. The constructed wetland comprises a four-layer, vertically permeated earthen body, which is planted with reeds. The carbon degradation, the nitrification, and the phosphorous elimination occur by absorption in the earthen body in the first two layers. The nitrification is performed in the third layer. In addition, a straw carbon wastewater extract is introduced into the third layer as an organic carbon source. The layers are constructed from various materials and have differing homogeneity. The dwell time is achieved in that a backup is generated in the polluted water flowing from top to bottom.

A biopolder [intermediate bed] for the biological purification of soils and sludges is described in DE 43 23 610, in which an aerobic area and an anaerobic area are situated one above another. In the anaerobic area, nitrogen oxides are converted into nitrogen and oxygen and/or water by denitrifying microorganisms. The wastewater first permeates the aerobic area and subsequently the anaerobic area. The organic pollutants present in the soil or sludge, e.g., petroleum, are chemically converted by aerobic microorganisms. The pollutants or reaction products which are not converted in the aerobic area reach the anaerobic area and may be converted therein by further microorganisms. A water-permeable nonwoven material may be situated between the aerobic area and the anaerobic area. The upper area is formed by a soil or sludge layer and the anaerobic area by a drainage bulk product.

A vertical-horizontal filter unit for the purification of wastewater is described in DE 197 37 690. The unit comprises a lower filter zone and an upper filter zone. The upper filter zone may contain clay minerals and/or iron filings, and the lower filter zone comprises fine gavel and/or medium gravel and carbonaceous additives may be admixed therewith. A barrier layer having openings is located between upper filter zone and lower filter zone. A division into an aerobic area or an anaerobic area is not described.

The units described in the prior art have problems in regard to the achievability of an optimum metabolic performance for various reasons, in particular denitrification performance in the aerobic area. It is therefore desirable to provide a unit in which an increase of the metabolism, in particular the denitrification, may be achieved via suitable devices and measures, in order to thus eliminate pollutants and environmentally-harmful substances.

This object is achieved by a horizontal-vertical filter unit and a method described herein.

SUMMARY OF THE INVENTION

The core of the invention is that the upper and lower filter zones are constructed homogeneously from gravel, sand, and the like. In the units known up to this point, the layers of the individual filter zones comprise different materials. Through the construction according to the invention, a simplification of the filter configuration and finally an economically and ecologically outstanding filter performance are achieved.

In order to increase the denitrification performance in the lower filter zone of the filter unit according to the invention, carbon substrates are supplied via a device, such as an external container. This may be a medium which contains carbon sources in arbitrary form. In its simplest form, the medium comprises wastewater which has not been biologically treated, and which has not passed through the upper filter zone.

To increase the filter performance, microorganisms, such as bacteria or yeasts, are preferably supplied to the lower filter zone. These microorganisms are preferably facultatively anaerobic and genetically modified so that they, possibly with the addition of further substances, cause a conversion of the pollutants into environmentally-compatible materials.

In a first embodiment, the wastewater which is biologically purified in the upper filter zone reaches the lower filter zone through one or more openings of the barrier layer, which are preferably situated at the edges of the unit. A carbonaceous medium, such as wastewater which has not been biologically treated, for example, from the inflow apparatus of the upper filter zone, is conveyed directly into the lower filter zone through pipelines or similar apparatuses. The delivery quantity may be regulated using a slide, for example.

A mixture of the nitrified wastewater which is biologically treated in the upper zone with the wastewater which has not been biologically treated occurs in the lower filter zone, whereby organic carbon is available to the denitrifying microorganisms and a denitrification is also made possible.

The same method sequence is also made possible if the barrier layer between the zones within the unit has no openings, which is a component of the second embodiment. In this case, the wastewater which is biologically treated in the upper zone may be conducted via removable devices into a separately situated receptacle (container, shaft, basin, inter alia). At this location, wastewater which has not been biologically treated and/or wastewater which does not yet have a sufficient quantity of organic carbon compounds for denitrification is admixed. The wastewater mixed in this way is introduced into the lower filter zone, where the denitrification occurs under anaerobic conditions.

The third embodiment is characterized in that instead of wastewater which has not been biologically treated, and/or wastewater which does not yet have a sufficient quantity of organic carbon compounds for the denitrification, another carbon source is admixed, such as methanolic acid, acetic acid, etc. Further organic substances may also be admixed, which arise during the processing processes, inter alia, such as polluted water from compost production, press water from biofermentation, fermentation residues, polluted water from wine and fruit preparation, distilleries, animal husbandry, etc. The supply of organic carbon compounds preferably occurs via a device, such as a container, in that the wastewater may be supplied to the lower filter zone or in that organic carbon compounds may be externally supplied. Furthermore, a supply of microorganisms and other substances into the lower filter zone is possible via such a device. Through the supply of microorganisms, an inoculation of the lower filter zone may be performed, so that the cultivation of specific pollutant-degrading bacteria strains or yeast strains is possible. It is also possible to supply genetically modified microorganisms, which are specialized for the degradation of specific (pollutant) materials. An advantage is that this inoculation of the lower filter zone occurs in a closed area and cannot directly reach the purified water and/or the environment. The upper filter zone lying above it protects the lower filter zone from washing out of the introduced active ingredients in the event of strong rainfall or other flooding situations.

Through this specific inoculation of the lower filter zone, an enrichment of pollutants in the food chain may be intentionally reduced and possibly completely prevented. It is thus possible to effectively remove the pollutants from strongly strained wastewater and/or soil.

Furthermore, a subsequent inoculation is also possible, for example, if a water analysis has the result that a contamination exists. Depending on the contamination, a specific inoculation with microorganisms which are possibly genetically modified may be performed.

The fourth embodiment provides a device in the drain of the method which ensures diversified and differing milieu conditions in both filter zones. The device may be a mechanical valve, a pump, inter alia, which first keeps the drain out of the unit closed, until a desired flooding goal is reached from bottom to top. The lower filter zone may be flooded completely or also only partially or also not at all. When the desired flooding goal is achieved, the device in the drain of the unit opens and/or the pump conveys the accumulated wastewater out of the unit. After the emptying of a desired quantity of wastewater, the device in the drain closes and/or the pump shuts off The flooding process now begins again from the start.

Through this alternating flooding operation, diversified and differing milieu conditions are achieved in the various zones, which overall have the result that all desired biological degradation processes are achieved in the unit. The process of the biological degradation of the organic cargo and a nitrification performance are predominantly achieved in the non-flooded, aerobic phase, because air oxygen may reach the filter pores. A denitrification is predominantly achieved in the dammed phase, because anaerobic conditions predominately exist here and thus, on the one hand, the inflowing unpurified wastewater is no longer sufficiently aerobically degraded and, on the other hand, good conditions prevail for denitrification. A continuous, automatic change of the media conditions within the filter zones, which is achieved by the setting of the drain device, is necessary in order to achieve overall good degradation performances for the organic pollutant cargo and the nitrogen cargo.

In the optional application of this fourth embodiment, a barrier layer between the filter zones may be dispensed with, but this is not absolutely necessary.

The fifth embodiment is provided for the targeted retention of phosphate compounds. It may be used where requirements for the drain quality of the purified wastewater also incorporate the parameter of phosphate.

Phosphorus is a valuable plant nutrient, which only occurs in limited quantities in nature and thus represents a very limited natural resource for the supply of plants on earth. With this background, it is to be classified as questionable and/or unsustainable that in those known wastewater treatment methods, which have to fulfill requirements for phosphate drain values, this valuable plant nutrient, which is extremely limited in its occurrence, is made contaminated and/or unusable forever by adding chemicals or other methods.

Phosphate retention in overgrown soil filters is very different depending on the physical and chemical composition of the filter material used. For example, if a ferrous and/or calciferous filter substrate is used, the absorption and accumulation capacity of phosphorus compounds is to be assessed as higher than with substrates having low iron or limestone content.

However, ferrous and calciferous substrates may also decrease or even entirely lose their absorption and accumulation capacity for phosphorus compounds.

In order to avoid this effect, the fifth embodiment provides the following two variants.

If the phosphorus binding capacity decreases in the soil filter, in the first variant, for example, iron filings, ferrous materials, rocks, inter alia, or calciferous materials, rocks, or liquids may be introduced into the filter zones. These ensure an improvement of the phosphate accumulation capacity for a specific period of time. If this capacity decreases again, the introduction of the above-mentioned materials may be repeated.

The second variant is a device for phosphate retention, which may typically be used after an overgrown soil filter. The biologically treated wastewater is conducted via a filter body which contains elements having a high phosphorus binding capacity. This filter body may comprise ferrous, calciferous, or comparable mineral components. The filter body is located in a sealed container, shaft, basin, or the like, which has a removal and/or outflow device on the bottom.

If the phosphate binding capacity decreases after a period of time because of the phosphate accumulation which has already occurred, the material may be used as phosphate fertilizers while maintaining the legal requirements in gardens, gardening, and landscaping.

BRIEF DESCRIPTION OF THE DRAWINGS

The object of the present invention is explained in greater detail in appended FIGS. 1 and 2, which show preferred embodiments.

DETAILED DESCRIPTION OF THE PREFERRED EMBODIMENTS

Figure 1:
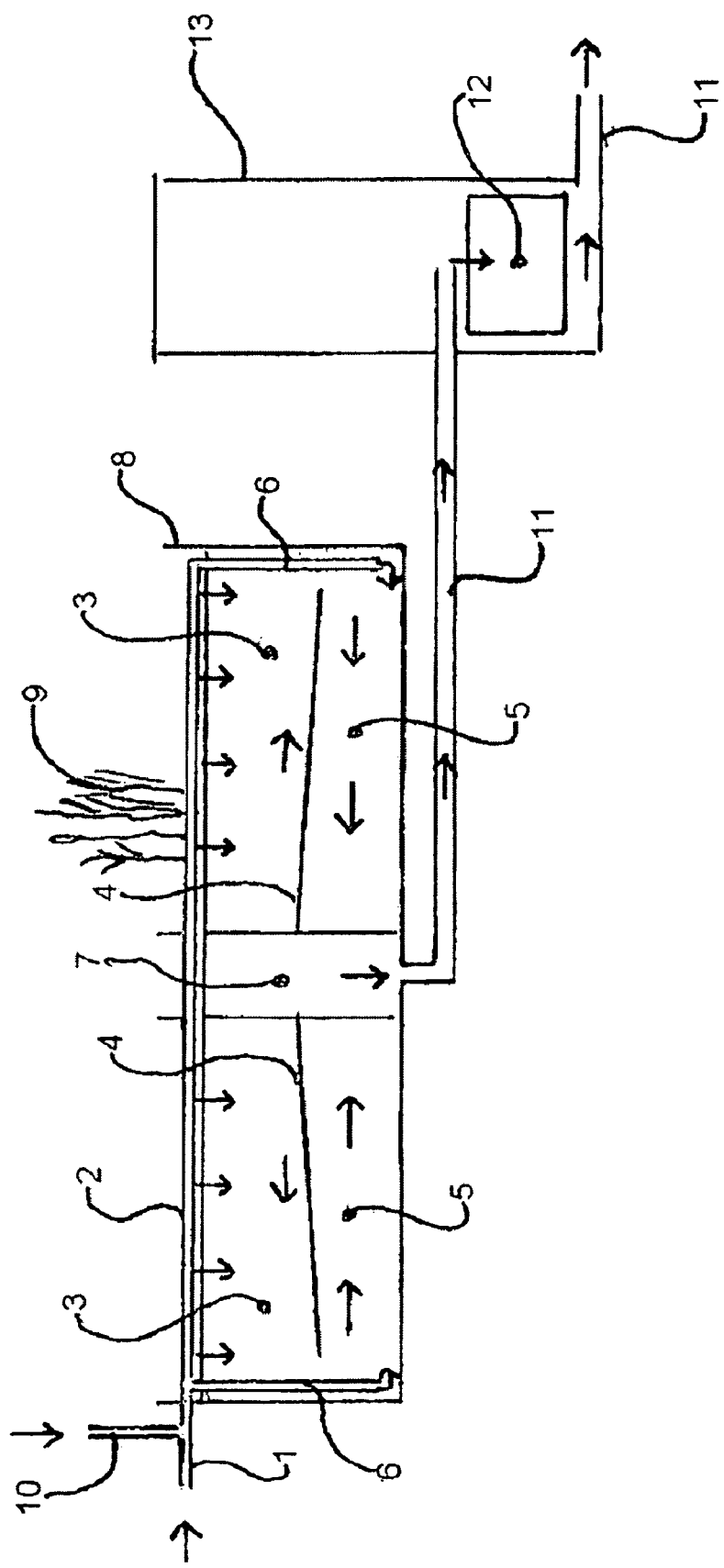

FIG. 1 shows a horizontal-vertical filter unit according to the invention, as it is constructed in the first chamber, second and third embodiments. Via an inflow 1, polluted water (wastewater) reaches the upper filter zone 3 via a distributor system 2. The best results are achieved if the polluted water is applied uniformly on the upper filter zone 3. The water passes vertically through the upper filter zone 3. If it reaches the barrier layer having openings 4, a horizontal flow occurs in the upper filter zone 3 toward the edges. The barrier layer 4 having underlay is preferably inclined so that the flow direction is predetermined. The polluted water is conducted from the upper filter zone 3 into the lower filter zone 5 by the water load pressing from above. Through the configuration according to the invention, a sufficient dwell time and filtering time is achieved in the individual areas. An uncontrolled vertical permeation of the water is prevented by the barrier layer having openings 4. The wastewater thus purified reaches the drain 11 via a central device 7.

Further carbon compounds, microorganisms, or other substances may be fed into the lower filter zone 5. The device 6 is separated from the soil by a seal 8. Planting with plants 9 may be performed on the upper filter zone 3.

The wastewater purified via the drain 11 may be treated in a further embodiment in a phosphate retention device 12. The phosphate thus obtained may be collected in a container 13. The wastewater which has been freed of phosphate finally reaches the provided demand systems via the outflow 11.

Figure 2:
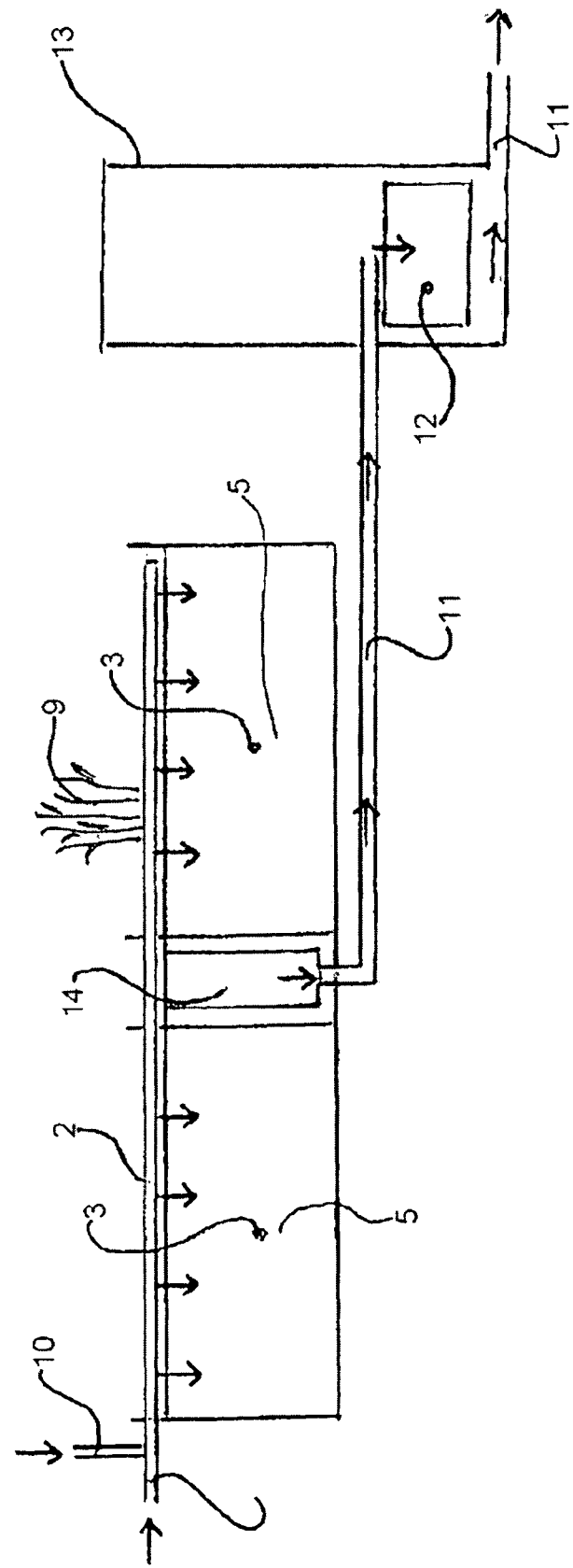

In FIG. 2, the construction of the fourth embodiment of the present invention is shown. The upper filter zone 3 and the lower filter zone 5 adjoin one another without a barrier layer 4. In this embodiment, flooding regulators, in particular valves and/or pumps, are provided, which ensure diverse and differing milieu conditions in the two filter zones 3, 5. Firstly, flooding is caused in the lower filter zone 5, whereby this filter zone is subjected to anaerobic milieu conditions. The upper filter zone is defined by an aerobic area, which is a function of the flooding boundary. The processes already explained above thus run in the individual filter zones 3, 5. In addition, in this embodiment a device 7 is included for admixing materials for improving the phosphate capacity.

LIST OF REFERENCE NUMERALS inflow 1
distributor system 2
upper filter zone 3
barrier layer having openings at the edges 4
lower filter zone 5
device for introducing polluted water which has not been biologically treated into the lower filter zone 6
device for collecting and draining purified polluted water 7
seal 8
plants 9
device for admixing materials for improving the phosphate binding capacity 10 (first variant)
drain 11
device for phosphate retention 12 (second variant)
container, shaft, basin, inter alia 13
device 14 for diverse and differing milieu conditions in the filter zone 3, 5.

An array of advantages is achieved by the present invention, in particular a sudden improvement of the denitrification performance and/or the phosphate retention and/or the phosphate elimination.

The invention claimed is:

1. A vertical-horizontal filter unit for the biological purification of polluted water, comprising:
an upper filter zone (3) having feeds (1) for the polluted water,
a lower filter zone (5), situated beneath it,
a barrier layer (4) having opening(s), wherein the barrier layer (4) is situated between the upper and lower filter zones (3, 5),
and at least one removal location (7), the polluted water permeating the lower filter zone (5) after permeating the upper filter zone (3) and the filter unit having a seal (8) in relation to the soil on its sides and/or its floor, wherein
the filter unit comprises a device (6) for introducing a medium, which contains organic carbon, into the lower filter zone (5), or for introducing microorganisms and/or substances, which cause or support metabolism of the materials contained in the polluted water, into the lower filter zone (5),
the upper filter zone (3) is an aerobic filter zone, in which a nitrification of the polluted water occurs,
the lower filter zone (5) is an anaerobic filter zone, having denitrifying microorganisms, in which mixing and denitrification of the nitrified polluted water, which was treated in the upper filter zone (3), with a medium, which contains organic carbon, occurs, wherein the barrier layer (4) having opening(s) is situated between the upper and lower filter zones (3, 5),
the lower filter zone (3) and the upper filter zone (5) are homogeneous.

2. The filter unit according to claim 1, characterized by the following feature:
polluted water which is biologically untreated is introduced via the device (6).

3. The filter unit according to claim 1, characterized by the following feature:
methanolic acid or acetic acid is introduced via the device (6).

4. The filter unit according to claim 1, characterized by the following feature:
polluted water from compost production, wine and food processing or animal husbandry, and/or press water from biofermentation is introduced via the device (6).

5. The filter unit according to claim 1, characterized by the following feature:
organic substances, in particular fermentation residues or residues from animal husbandry, are introduced via the device (6).

6. The filter unit according to claim 1, characterized by the following feature:
the barrier layer (4) runs diagonally downward.

7. The filter unit according to claim 1, characterized by the following features:
the upper filter zone (3) has a least one removal device for biologically purified water,
a separately situated receptacle receives the biologically purified water and discharges it into the lower filter zone (5).

8. The filter unit according to claim 7, characterized by the following feature:
the receptacle has a unit for admixing the carbonaceous medium and/or an organic substance.

9. The filter unit according to claim 1, characterized by the following feature:
flooding regulators, valves and/or pumps, are situated in the upper and/or lower filter zones (3, 5).

10. The filter unit according to claim 1, characterized by the following feature:
filter bodies having higher phosphorous binding capacity are situated in the upper and/or lower filter zones (3, 5).

11. The filter unit according to claim 1, characterized by the following feature:
the microorganisms are genetically modified bacteria strains or yeast strains.

12. The vertical-horizontal filter unit of claim 1, wherein said upper filter zone (3) and/or said lower filter zone (5) comprises gravel or sand.

13. A method for polluted water purification by horizontal-vertical filtering, in which an upper filter zone is permeated with polluted water into a lower filter zone situated underneath, a barrier layer having opening(s) being situated between the upper and lower filter zones, a seal to the soil being produced at the sides and/or the floor, characterized in that a medium which contains organic carbon is introduced into the lower filter zone, and the upper filter zone is an aerobic zone, in which a nitrification of the polluted water occurs, and the lower filter zone is an anaerobic zone having denitrifying microorganisms, in which mixing and denitrification of the nitrified polluted water which was treated in the upper filter zone with a medium which contains organic carbon occurs, the lower filter zone and the upper filter zone being homogeneous, and microorganisms and/or substances which cause or support metabolism of the materials contained in the polluted water are supplied into the lower filter zone (5) via a device (6).

14. The method according to claim 13, characterized by the following feature:

different milieu conditions are caused by flooding in the upper filter zone and the lower filter zone.

15. The method according to claim 13, characterized by the following feature:

the lower filter zone is inoculated using microorganisms and/or metabolically-active substances.

16. The method of claim 13, wherein said upper filter zone (3) and/or said lower filter zone (5) comprises gravel or sand.

* * * * *

UNITED STATES PATENT AND TRADEMARK OFFICE
CERTIFICATE OF CORRECTION

| | | |
|---|---|---|
| PATENT NO. | : 8,029,673 B2 | Page 1 of 1 |
| APPLICATION NO. | : 12/516154 | |
| DATED | : October 4, 2011 | |
| INVENTOR(S) | : Böttcher | |

It is certified that error appears in the above-identified patent and that said Letters Patent is hereby corrected as shown below:

Title Page, Item [56] under FOREIGN APPLICATION PRIORITY DATA, replace "06024475" with --06024475.3--.

Column 3, Line 35, replace "shuts off The flooding" with --shuts off. The flooding--.

Signed and Sealed this
Fourteenth Day of February, 2012

David J. Kappos
*Director of the United States Patent and Trademark Office*